(12) United States Patent
Murakami et al.

(10) Patent No.: US 7,703,110 B2
(45) Date of Patent: Apr. 20, 2010

(54) STRUCTURE FOR ATTACHING PRINTED CIRCUIT BOARD ON TRAVERSE CHASSIS

(75) Inventors: Takayuki Murakami, Osaka (JP); Ryuuji Hayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 912 days.

(21) Appl. No.: 11/507,111

(22) Filed: Aug. 21, 2006

(65) Prior Publication Data

US 2007/0044114 A1  Feb. 22, 2007

(30) Foreign Application Priority Data

Aug. 22, 2005  (JP)  ............... 2005-239588

(51) Int. Cl.
| G11B 17/047 | (2006.01) |
| G11B 7/08 | (2006.01) |
| G11B 7/13 | (2006.01) |
| G11B 33/12 | (2006.01) |

(52) U.S. Cl. ............... 720/653; 720/661; 720/652
(58) Field of Classification Search ............... 720/661, 720/652, 653, 663, 659, 658
See application file for complete search history.

(56) References Cited

U.S. PATENT DOCUMENTS

| 5,727,761 A * | 3/1998 | Ho ............... 248/222.12 |
| 5,821,531 A * | 10/1998 | Nomura et al. ....... 250/231.13 |

2004/0235322 A1* 11/2004 Hooper ............... 439/95

FOREIGN PATENT DOCUMENTS

| JP | 09311057 A | * | 12/1997 |
| JP | 11008481 A | * | 1/1999 |
| JP | 11-224482 | | 8/1999 |
| JP | 2003-297065 | | 10/2003 |
| JP | 2004-253130 | | 9/2004 |

OTHER PUBLICATIONS

Patent Abstracts of Japan, Publication No. 2004-253130, Publication Date Sep. 9, 2004 (2 pages).
Patent Abstracts of Japan, Publication No. 2003-297065, Publication Date Oct. 17, 2003 (2 pages).
Patent Abstracts of Japan, Publication No. 11-224482, Publication Date Aug. 17, 1999 (2 pages).

* cited by examiner

*Primary Examiner*—Julie Anne Watko
(74) *Attorney, Agent, or Firm*—Osha • Liang LLP

(57) ABSTRACT

A first groove, a second groove, and a prepared hole are formed in a traverse chassis. The first groove restricts the downward movement of a printed circuit board as a lower edge portion of the board is slidably pinched in the first groove. The second groove restricts the sliding movement in one direction of the board as an edge portion on one side of both lateral sides of the board whose lower edge portion is nipped in the first groove is fitted in the second groove. The prepared hole vertically penetrates a portion of the traverse chassis defining the first groove and is disposed adjacent to an edge portion on another side of the both lateral sides of the board whose edge portion on the one side is fitted in the second groove.

5 Claims, 5 Drawing Sheets

STRUCTURE FOR ATTACHING PRINTED CIRCUIT BOARD ON TRAVERSE CHASSIS

BACKGROUND OF THE INVENTION

1. Field of the Invention

The present invention relates to an optical disk apparatus for reproducing and recording information with respect to an optical disk such as a CD or a DVD which is an information recording medium, and more particularly to a structure in which a printed circuit board, which is a component element of an encoder for controlling the driving of a motor for driving each of a pickup unit, a traverse chassis, and a disk tray, is attached in an upright state on the traverse chassis.

2. Description of the Related Art

In general, an optical disk apparatus is an apparatus in which a clamped optical disk is rotated, and laser light is applied to a recording surface of the optical disk to write (record) information on the recording surface, and the laser light reflected from the recording surface of the optical disk is received to read (reproduce) the information on the recording surface. The outer configuration of the optical disk apparatus is mainly comprised of a fixed main chassis and a movable traverse chassis (e.g., refer to JP-A-2004-253130, JP-A-2003-297065 and JP-A-11-224482). A disk tray is supported in the main chassis in such a manner as to be drawably inserted into the main chassis from the front side.

Referring to FIG. 5, a description will be given below of an example of the specific construction of such an optical disk apparatus. A main chassis 1 is a molded product of a synthetic resin such as polystyrene (PS), and a traverse chassis 2 is a molded product of a synthetic resin such as polyphenylene ether (PPE).

A pickup unit 3 which reciprocatingly moves in the radial direction (in the back-and-forth direction in FIG. 5) parallel to the recording surface of the optical disk is provided on the traverse chassis 2. A motor 4 for mainly moving the pickup unit 3, as well as a gear train 5 consisting of a plurality of spur gears which mesh with each other while one of them meshes with a spindle gear of this motor 4 and which are connected substantially in the back-and-forth direction, are provided on one side portion (right-side portion in FIG. 5) adjacent to the pickup unit 3. As one spur gear of the gear train 5 meshes with a rack 3a formed on a side of the pickup unit 3, the driving force of the motor 4 is transmitted to the pickup unit 3, thereby moving the pickup unit 3. It should be noted that the guiding of the movement of the pickup unit 3 is generally effected by a pair of guide shafts supported on the traverse chassis 2 in parallel to its moving direction.

In addition, the frontmost spur gear of the gear train 5 meshes with a tray gear 8 provided on the traverse chassis 2. This tray gear 8 is capable of meshing with a rack of a cam slider 6 disposed on the main chassis 1 side in front of the traverse chassis 2. The cam slider 6 is in cam engagement with a shift lever 7 provided on a front end portion of the traverse chassis 2, and is movable in the transporting direction (back-and-forth direction) of the disk tray and in a direction (left-and-right direction) substantially perpendicular to the raising/lowering direction of the traverse chassis 2. Further, as the rack of the cam slider 6 meshes with the tray gear 8, the driving force of the motor 4 is transmitted to the cam slider 6, so that the cam slider 6 moves in the left-and-right direction. While the shift lever 7 which is in cam engagement is thereby guided, the traverse chassis 2 is raised and lowered.

Furthermore, the tray gear 8 is capable of meshing with a rack formed on the disk tray in such a manner as to extend in the back-and-forth direction. As the rack of the disk tray meshes with the tray gear 8, the driving force of the motor 4 is transmitted to the disk tray, so that the disk tray is moved in the back-and-forth direction.

In such an optical disk apparatus, the optical disk is loaded on the disk tray drawn out of the main chassis 1, and as the motor 4 is driven, the disk tray is sent into the main chassis 1. When the disk tray is sent up to a predetermined position, the rack of the disk tray and the tray gear 8 are disengaged, and the rack of the cam slider 6 and the tray gear 8 are engaged with each other. As the motor 4 is driven, the cam slider 6 moves in the left-and-right direction to raise the traverse chassis 2. When the traverse chassis 2 is raised to a predetermined position, the rack of the cam slider 6 and the tray gear 8 are disengaged, and the optical disk is clamped.

Here, a specific description will be given of the clamping of the optical disk. A clamper holder is installed on the upper side of the main chassis 1 in such a manner as to extend in the left-and-right direction, and a substantially disk-shaped clamper is rotatably provided on its center. Meanwhile, a spindle motor is installed on the traverse chassis 2 opposing the clamper, and a turntable 9 which rotates as the spindle rotates (the spindle motor is driven) is fixed to a distal end of the spindle of this spindle motor. Then, as the traverse chassis 2 is raised, a central hole of the optical disk is fitted to the turntable 9, and the optical disk is clamped between the upper surface of the turntable 9 and the lower surface of the clamper.

When the optical disk is clamped, the rack 3a of the pickup unit 3 and the spur gear of the gear train 5 are meshed. Then, as the motor 4 is driven, the pickup unit 3 moves in the radial direction of the optical disk, and the reproduction and recording of information with respect to the optical disk are effected by an optical pickup which moves together with the pickup unit 3. It should be noted that when the optical disk is removed, an operation opposite to the above-described operation is carried out.

With such an optical disk apparatus, the driving of the pickup unit 3, the driving of the traverse chassis 2, and the driving of the disk tray are effected by the driving force of the motor 4, and an encoder E is used to properly control the driving of the motor 4 when each of these members is driven.

This encoder E is configured by a disk-shaped slit plate S fixed to the distal end of the spindle of the motor 4 as well as a photo interrupter (PI) P disposed in such a manner as to sandwich an outer peripheral portion of this slit plate S from above and below. A multiplicity of radial slits are formed in the slit plate S. The photo interrupter P is mounted on an exclusive-use printed circuit board (hereafter referred to as the "PI board" in some cases) 10 by soldering, and this PI board 10 is attached in an upright state on the traverse chassis 2. This attachment is performed by first screwing down the PI board 10 to an exclusive-use board holder, i.e., a separate part, by a screw, and by screwing down the board holder to the traverse chassis 2 by a tapping screw. This PI board 10 is connected to a control unit for controlling the operation of the overall optical disk apparatus.

In the above-described construction, the slit plate S rotates as the motor 4 is driven, i.e., as its spindle rotates. At that juncture, the slits which passed through the photo interrupter P are consecutively detected, and a pulse signal corresponding thereto is outputted from the PI board 10. The control unit, upon receiving the pulse signal, counts the number of pulses, and imparts to the motor 4 a drive signal (e.g., a signal concerning a voltage value to the motor 4) which is appropriate for driving each of the pickup unit 3, the traverse chassis 2, and the disk tray. It should be noted that reference character SW in FIG. 5 denotes an inner peripheral end detecting switch for detecting whether or not the pickup unit 3 has reached the inner peripheral end position of the optical disk. The point of time when an on/off output of this inner peripheral end detecting switch is provided is used as a reference point when the pulse signal from the PI board 10 is counted.

SUMMARY OF THE INVENTION

In recent years, there is a demand for a further cost reduction in optical disk apparatuses. In particular, concerning the encoder E for controlling the driving of the motor 4 for driving each of the pickup unit 3, the traverse chassis 2, and the disk tray, if the PI board 10, which is one of its component elements, can be installed on the traverse chassis 2 without the mediation of the board holder, it leads to a reduction in the number of parts by the portions of the board holder and the screw for fixing it and the PI board 10, which makes it possible to realize a cost reduction of the optical disk apparatus.

However, with the above-described optical disk apparatus, since the PI board 10 must be attached in an upright state on the traverse chassis 2, if the board holder is eliminated, for example, a plate-like rib is formed in advance on the traverse chassis 2, and the PI board 10 is superposed in an upright state on this rib and is screwed down while a hole is being tapped with a tapping screw. In this case, since it is necessary to form in the rib a prepared hole for receiving the tapping screw, as a mold for molding the traverse chassis 2, a pin-shaped mold for separately molding that prepared hole becomes additionally necessary. Then, the molding process of the traverse chassis 2 becomes inevitably complex, and the manufacturing cost of the traverse chassis 2 increases remarkably, with the result that the acquisition cost of the traverse chassis 2 is aggravated. Accordingly, a reduction in the cost of the optical disk apparatus is virtually hampered.

Accordingly, the present invention has been made in view of the above-described problems, and its object is to provide an inexpensive attachment structure which makes it possible to attach the PI board in an upright state on the traverse chassis.

To attain the above object, in accordance with the invention there is provided a structure for attaching a printed circuit board on a traverse chassis in an optical disk apparatus comprising: a main chassis; a disk tray for transporting an optical disk to the main chassis; a traverse chassis which is raised and lowered with respect to a recording surface of the optical disk transported into the main chassis; a pickup unit having an optical pickup which reciprocatingly moves in a radial direction parallel to the recording surface of the optical disk while being supported by the traverse chassis; a motor provided in the traverse chassis to drive the disk tray, the traverse chassis, and the pickup unit; and an encoder including a slit plate which is fixed to a spindle of the motor and rotates as the motor is driven and a printed circuit board on which a photo interrupter is mounted sandwiching the slit plate from above and below and which is attached in an upright state on the traverse chassis, the printed circuit board being attached without a board holder screwed down with a screw to the traverse chassis, wherein a first groove, a second groove, and a prepared hole are formed in the traverse chassis, the first groove is adapted to restrict the downward movement of the printed circuit board as a lower edge portion of the printed circuit board is slidably pinched in the first groove, the second groove is adapted to restrict the sliding movement in one direction and the upward movement of the printed circuit board as an edge portion on one side of both lateral sides of the printed circuit board whose lower edge portion is nipped in the first groove is fitted in the second groove, the prepared hole vertically penetrates a portion of the traverse chassis defining the first groove, the prepared hole being disposed adjacent to an edge portion on another side of the both lateral sides of the printed circuit board whose edge portion on the one side is fitted in the second groove, the printed circuit board with the edge portion on the one side fitted in the second groove while the lower edge portion is nipped in the first groove being installed on the traverse chassis such that the sliding movement in another direction and the upward movement thereof are restrained by the tapping screw screwed into the prepared hole, and an upper side of the edge portion on the other side of the printed circuit board is notched, and an inner surface of a head of the tapping screw screwed into the prepared hole is brought into pressure contact with a lower end of the notch.

By adopting the above-described construction, even if the board holder and the screw for fixing it and the printed circuit board, which are conventionally required, are not used, it is possible to firmly install the printed circuit board in an upright state on the traverse chassis. Moreover, the traverse chassis can be obtained inexpensively without entailing an increase in the manufacturing cost.

In addition, to attain the above object, in accordance with the invention there is provided a structure for attaching a printed circuit board on a traverse chassis in an optical disk apparatus comprising: a main chassis; a disk tray for transporting an optical disk to the main chassis; a traverse chassis which is raised and lowered with respect to a recording surface of the optical disk transported into the main chassis; a pickup unit having an optical pickup which reciprocatingly moves in a radial direction parallel to the recording surface of the optical disk while being supported by the traverse chassis; a motor provided in the traverse chassis to drive the disk tray, the traverse chassis, and the pickup unit; and an encoder including a slit plate which is fixed to a spindle of the motor and rotates as the motor is driven and a printed circuit board on which a photo interrupter is mounted sandwiching the slit plate from above and below and which is attached in an upright state on the traverse chassis, wherein a first groove, a second groove, and a prepared hole are formed in the traverse chassis, the first groove is adapted to restrict the downward movement of the printed circuit board as a lower edge portion of the printed circuit board is slidably pinched in the first groove, the second groove is adapted to restrict the sliding movement in one direction of the printed circuit board as an edge portion on one side of both lateral sides of the printed circuit board whose lower edge portion is nipped in the first groove is fitted in the second groove, the prepared hole vertically penetrates a portion of the traverse chassis defining the first groove, the prepared hole being disposed adjacent to an edge portion on another side of the both lateral sides of the printed circuit board whose edge portion on the one side is fitted in the second groove, the printed circuit board with the edge portion on the one side fitted in the second groove while the lower edge portion is nipped in the first groove being attached on the traverse chassis such that the sliding movement in another direction and the upward movement thereof are restrained by a fixing member fixed to the prepared hole.

By adopting the above-described construction, it is possible to firmly attach the printed circuit board in an upright state on the traverse chassis. Moreover, the traverse chassis can be obtained inexpensively without entailing an increase in the manufacturing cost.

Here, in the light of practical use, an upper side of the edge portion on the other side of the printed circuit board should be notched, and an inner surface of a head of a tapping screw screwed into the prepared hole should be brought into pressure contact with a lower end of the notch.

According to the structure for attaching a printed circuit board on a traverse chassis in an optical disk apparatus in accordance with the invention, the board holder and the screw for fixing it and the printed circuit board, which are conventionally required, become completely unnecessary, so that this leads to a reduction in the number of parts by that portion. Moreover, the traverse chassis can be obtained inexpensively. As a result, it is possible to sufficiently realize a cost reduction of the optical disk apparatus.

DETAILED DESCRIPTION OF THE PREFERRED EMBODIMENTS

Figure 1:
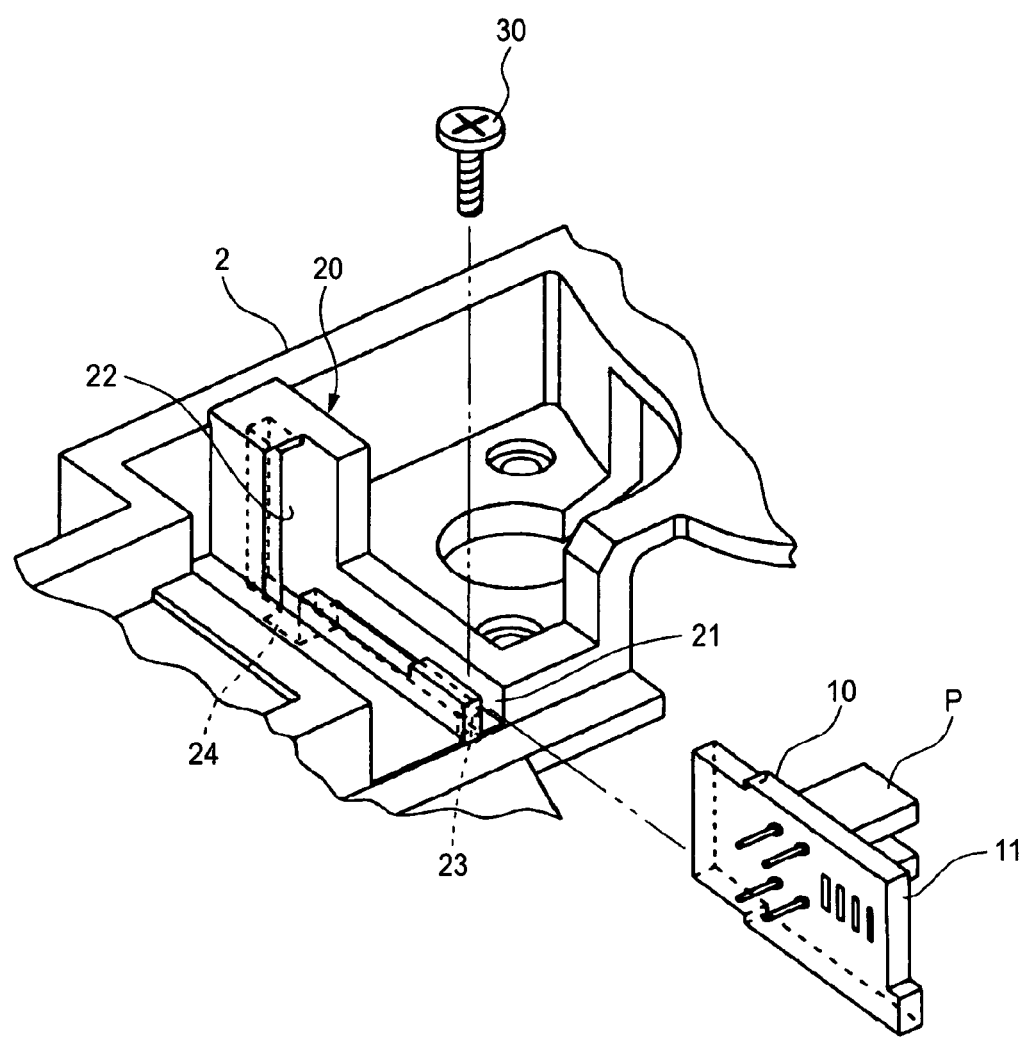
FIG. 1 is an exploded perspective view illustrating a structure for attaching a printed circuit board on a traverse chassis in an optical disk apparatus in accordance with an embodiment of the invention.
Figure 2:
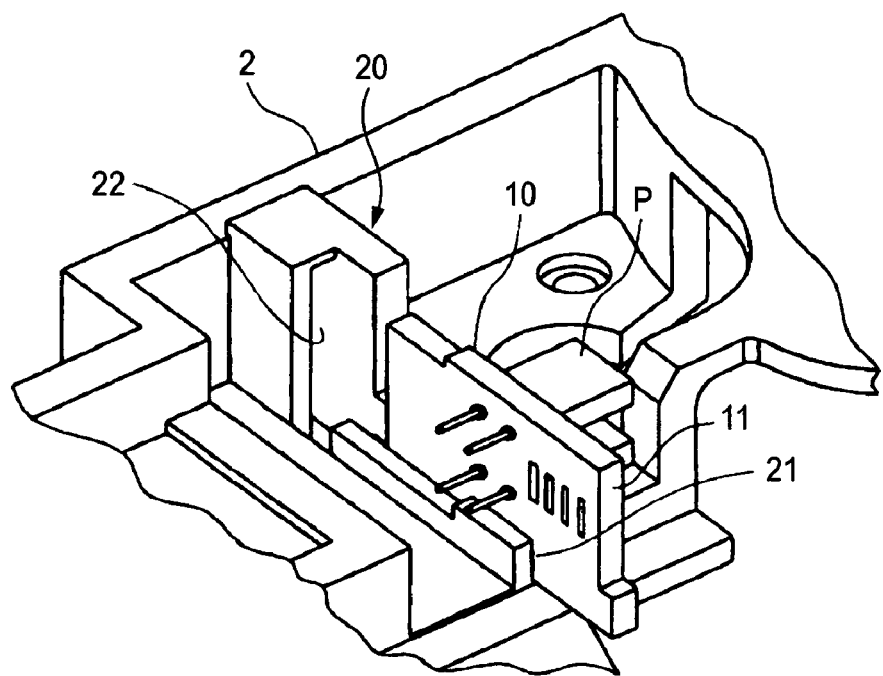
FIG. 2 is a perspective view illustrating a state of the attaching process in the installation structure shown in FIG. 1, and is a diagram illustrating a state in which the printed circuit board is being installed.
Figure 3:
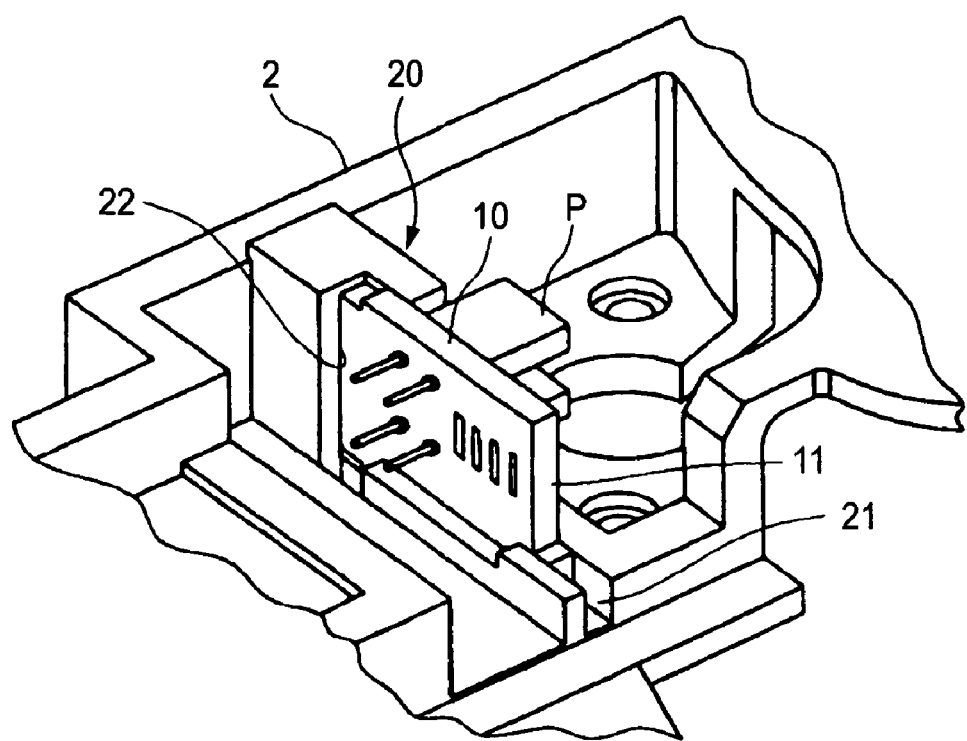
FIG. 3 is a perspective view illustrating a state of the attaching process in the installation structure shown in FIG. 1, and is a diagram illustrating a state persisting immediately before screwing down with a tapping screw.
Figure 4:
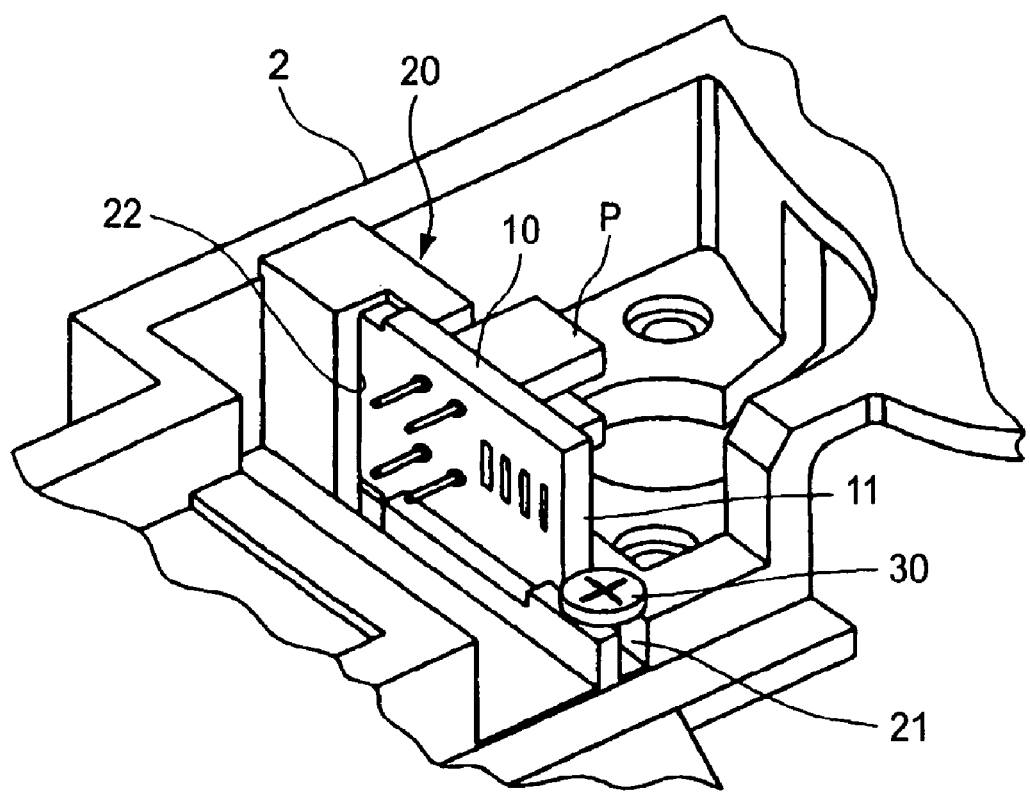
FIG. 4 is a perspective view illustrating a state of the attaching process in the installation structure shown in FIG. 1, and is a diagram illustrating a state of completion of installation.
Figure 5:
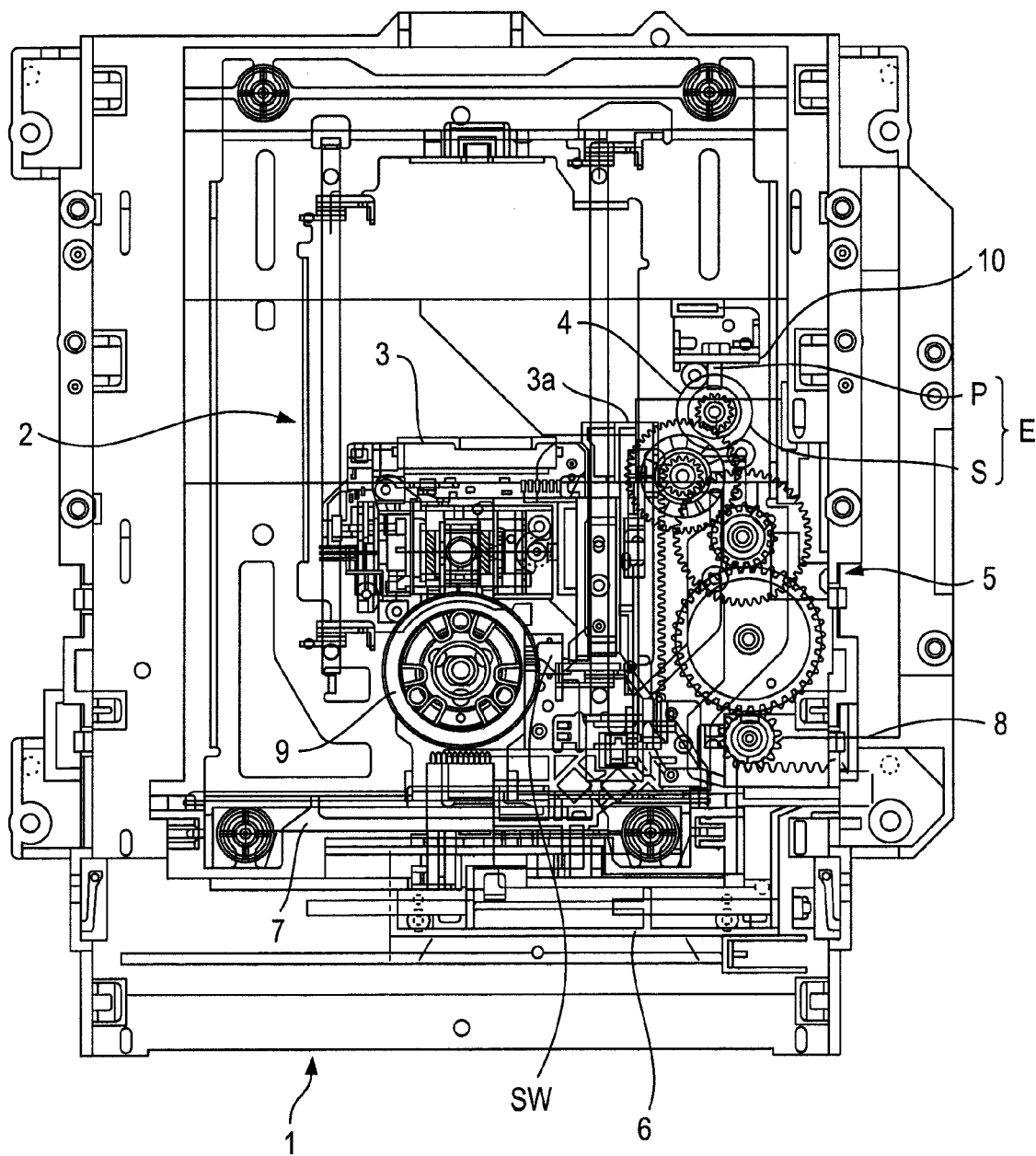
FIG. 5 is a plan view illustrating the construction of a general optical disk apparatus which is common to the invention.

Referring now to the drawings, a detailed description will be given of an embodiment of a structure for attaching a PI board on a traverse chassis in an optical disk apparatus in accordance with the invention. FIG. 1 is an exploded perspective view illustrating the structure for attaching a PI board on a traverse chassis in an optical disk apparatus in accordance with the embodiment of the invention. FIGS. 2 to 4 are perspective views illustrating states of the attaching process in the installation structure shown in FIG. 1, in which FIG. 2 shows a state in which the PI board is being installed, FIG. 3 shows a state persisting immediately before screwing down with a tapping screw, and FIG. 4 shows a state of completion of installation. It should be noted that in these drawings, as for an encoder E, among its component elements, a PI board 10 with a photo interrupter P mounted thereon is illustrated, and the illustration of a slit plate S is omitted.

In this embodiment, a substantially L-shaped projection 20 is formed on a traverse chassis 2 in such a manner as to extend in the left-and-right direction and project upwardly from its end. In the portion of this projection 20 which extends in the left-and-right direction, a first groove 21 whose width is substantially the same as (to be precise, slightly larger than) the thickness of the PI board 10 is formed along the left-and-right direction. This first groove 21 functions to receive a lower edge portion of the PI board 10 in an upright state, nip the edge portion from the front and rear sides so as to be slidable in the left-and-right direction, and restrict the downward movement of the PI board 10 including its back-and-forth movement.

In the upwardly projecting portion of the projection 20, a second groove 22 whose width is substantially the same as (to be precise, somewhat larger than) the thickness of the PI board 10 is formed vertically on an extension of the first groove 21.

An edge portion on one side (left side in this example) of both lateral sides (left and right sides in this example) of the PI board 10 whose lower edge portion is nipped in the first groove 21 is fitted in this second groove 22. This second groove 22 functions to nip that edge portion from front and rear sides, press down an upper end face of the PI board 10, and restrict the sliding movement in the leftward direction and upward movement of the PI board 10 including its back-and-forth movement.

Further, a prepared hole 23 for receiving a tapping screw 30 which will be described later is formed in the first groove 21 in such a manner as to vertically penetrate the traverse chassis 2. This prepared hole 23 is formed at a position adjacent to a right edge portion of the PI board 10 whose left edge portion is fitted in the second groove 22 while its lower edge portion is being nipped in the first groove 21.

The formation of the projection 20 as well as the first groove 21, the second groove 22, and the prepared hole 23 is effected simultaneously with the molding of the traverse chassis 2. The formation of the first groove 21 suffices if a projecting portion is fabricated on the shape of a carved portion of an upper mold of the upper and lower molds used for molding. Further, the formation of the second groove 22 suffices if a projecting portion is fabricated on the shape of a carved portion of the lower mold which makes a pair with the upper mold. A through hole 24 formed on the extension of the second groove 22 is formed to introduce the fabricated projecting portion into the lower mold (see FIG. 1). Furthermore, the formation of the prepared hole 23 suffices if a pin-shaped projecting portion is fabricated on the shape of the carved portion of the upper or lower mold. Accordingly, since such a traverse chassis 2 can be obtained without making the molding process complex and can be obtained inexpensively without entailing an increase in the manufacturing cost.

In addition, in this embodiment, an upper side of the right edge portion of the PI board 10 is notched, and a notch 11 is thus formed.

The installation of the PI board 10 on the traverse chassis 2 thus constructed is carried out as follows. As shown in FIG. 2, in a state in which the PI board 10 is made upright, its lower edge portion is inserted into the first groove 21, and the PI board 10 is slid toward the second groove 22. Next, as shown in FIG. 3, the left edge portion of the PI board 10 in that state is fitted into the second groove 22. Then, while the tapping screw 30 is kept along the right end face of the PI board 10, the tip of the tapping screw 30 is applied to the prepared hole 23 and is screwed into it. If the tapping screw 30 is screwed in as it is, as shown in FIG. 4, the inner surface of the head of the tapping screw 30 is brought into pressure contact with the lower end of the notch 11 of the PI board 10, thereby completing the installation of the PI board 10 on the traverse chassis 2.

In this state, the lower movement of the PI board 10 is restricted by the first groove 21, its leftward and upward movement is restricted by the second groove 22, and its rightward and upward movement is restricted by the tapping screw 30. Namely, the PI board 10 is firmly installed in an upright state on the traverse chassis 2.

By adopting the above-described construction, the board holder and the screw for fixing it and the PI board 10, which are conventionally required, become completely unnecessary, so that this leads to a reduction in the number of parts by that portion. Moreover, the traverse chassis 2 can be obtained inexpensively without entailing an increase in the manufacturing cost. As a result, it is possible to sufficiently realize a cost reduction of the optical disk apparatus.

It should be noted that the invention is not limited to the above-described embodiment, and various modifications are possible without departing from the gist of the invention. For example, instead of forming the notch 11 in the PI board 10, a long tapping screw 30 may be prepared, and the inner surface of its head may be directly brought into pressure contact with the upper end face of the PI board 10. Instead of the tapping screw 30, a fixing member such as a hook, an adhesive agent may be employed.

The present invention is useful for an optical disk apparatus for reproducing and recording information with respect to an optical disk.

What is claimed is:

1. A structure for attaching a printed circuit board on a traverse chassis in an optical disk apparatus, comprising:
   a main chassis;
   a disk tray for transporting an optical disk to the main chassis;
   a traverse chassis which is raised and lowered with respect to a recording surface of the optical disk transported into the main chassis;
   a pickup unit having an optical pickup which reciprocatingly moves in a radial direction parallel to the recording surface of the optical disk while being supported by the traverse chassis;
   a motor provided in the traverse chassis to drive the disk tray, the traverse chassis, and the pickup unit; and
   an encoder including a slit plate which is fixed to a spindle of the motor and rotates as the motor is driven and a printed circuit board on which a photo interrupter is mounted sandwiching the slit plate from above and below and which is attached in an upright state on the traverse chassis, the printed circuit board being attached without a board holder screwed down with a screw to the traverse chassis,
   wherein a first groove, a second groove, and a prepared hole are formed in the traverse chassis,
   the first groove is adapted to restrict the downward movement of the printed circuit board as a lower edge portion of the printed circuit board is slidably pinched in the first groove,
   the second groove is adapted to restrict the sliding movement in one direction and the upward movement of the printed circuit board as an edge portion on one side of both lateral sides of the printed circuit board whose lower edge portion is nipped in the first groove is fitted in the second groove,
   the prepared hole vertically penetrates a portion of the traverse chassis defining the first groove, the prepared hole being disposed adjacent to an edge portion on another side of the both lateral sides of the printed circuit board whose edge portion on the one side is fitted in the second groove,
   the printed circuit board with the edge portion on the one side fitted in the second groove while the lower edge portion is nipped in the first groove being installed on the traverse chassis such that the sliding movement in another direction and the upward movement thereof are restrained by the tapping screw screwed into the prepared hole, and
   an upper side of the edge portion on the other side of the printed circuit board is notched, and an inner surface of a head of the tapping screw screwed into the prepared hole is brought into pressure contact with a lower end of the notch.

2. A structure for attaching a printed circuit board on a traverse chassis in an optical disk apparatus, comprising:
   a main chassis;
   a disk tray for transporting an optical disk to the main chassis;
   a traverse chassis which is raised and lowered with respect to a recording surface of the optical disk transported into the main chassis;
   a pickup unit having an optical pickup which reciprocatingly moves in a radial direction parallel to the recording surface of the optical disk while being supported by the traverse chassis;
   a motor provided in the traverse chassis to drive the disk tray, the traverse chassis, and the pickup unit; and
   an encoder including a slit plate which is fixed to a spindle of the motor and rotates as the motor is driven and a printed circuit board on which a photo interrupter is mounted sandwiching the slit plate from above and below and which is attached in an upright state on the traverse chassis,
   wherein a first groove, a second groove, and a prepared hole are formed in the traverse chassis,
   the first groove is adapted to restrict the downward movement of the printed circuit board as a lower edge portion of the printed circuit board is slidably pinched in the first groove,
   the second groove is adapted to restrict the sliding movement in one direction of the printed circuit board as an edge portion on one side of both lateral sides of the printed circuit board whose lower edge portion is nipped in the first groove is fitted in the second groove,
   the prepared hole vertically penetrates a portion of the traverse chassis defining the first groove, the prepared hole being disposed adjacent to an edge portion on another side of the both lateral sides of the printed circuit board whose edge portion on the one side is fitted in the second groove,
   the printed circuit board with the edge portion on the one side fitted in the second groove while the lower edge portion is nipped in the first groove being attached on the traverse chassis such that the sliding movement in another direction and the upward movement thereof are restrained by a fixing member fixed to the prepared hole.

3. The structure for attaching a printed circuit board on a traverse chassis according to claim 2, the second groove is adapted to restrict the upward movement of the printed circuit board as the edge portion on the one side of the printed circuit board whose lower edge portion is nipped in the first groove is fitted in the second groove.

4. The structure for attaching a printed circuit board on a traverse chassis according to claim 2, wherein the fixing member is a tapping screw screwed into the prepared hole.

5. The structure for attaching a printed circuit board on a traverse chassis according to claim 4, wherein an upper side of the edge portion on the other side of the printed circuit board is notched, and an inner surface of a head of the tapping screw screwed into the prepared hole is brought into pressure contact with a lower end of the notch.

* * * * *